United States Patent
Okuno (10) Patent No.: US 7,872,451 B2
(45) Date of Patent: Jan. 18, 2011

(54) APPARATUS FOR CHARGING ON-VEHICLE BATTERY AND APPARATUS FOR CONTROLLING GENERATING OPERATION OF ON-VEHICLE GENERATOR

(75) Inventor: Tomoya Okuno, Nishio (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 12/232,367

(22) Filed: Sep. 16, 2008

(65) Prior Publication Data

US 2009/0072794 A1  Mar. 19, 2009

(30) Foreign Application Priority Data

Sep. 18, 2007  (JP)  ............... 2007-241067

(51) Int. Cl.
*H02J 7/04* (2006.01)
*H02J 7/16* (2006.01)

(52) U.S. Cl. .................. 320/145; 318/449; 322/36

(58) Field of Classification Search ......... 320/145; 318/449; 322/36
See application file for complete search history.

(56) References Cited

U.S. PATENT DOCUMENTS

| | | | |
|---|---|---|---|
| 6,137,247 A | 10/2000 | Maehara et al. | |
| 6,466,519 B1 * | 10/2002 | Nakamura et al. | ............ 368/64 |
| 6,700,353 B2 | 3/2004 | Asada | |
| 6,795,378 B2 * | 9/2004 | Shimizu et al. | ............ 368/204 |
| 7,285,937 B2 * | 10/2007 | Asada | ............ 322/24 |
| 7,292,008 B2 * | 11/2007 | Asada | ............ 322/24 |
| 7,327,123 B2 * | 2/2008 | Faberman et al. | ............ 322/37 |
| 7,576,520 B2 * | 8/2009 | Maruyama et al. | ............ 322/28 |
| 2002/0000791 A1 | 1/2002 | Taniguchi et al. | |

FOREIGN PATENT DOCUMENTS

| | | |
|---|---|---|
| JP | A-11-262299 | 9/1999 |
| JP | A-2000-32680 | 1/2000 |
| JP | 3070788 B2 | 7/2000 |
| JP | A-2002-017053 | 1/2002 |
| JP | A-2002-127848 | 5/2002 |
| JP | 2002-315221 A | 10/2002 |
| JP | 2002-315222 A | 10/2002 |

OTHER PUBLICATIONS

Japanese Office Action issued in Japanese Patent Application No. 2007-241067 on Feb. 16, 2010 (with English translation).
Office Action issued on Oct. 19, 2010 in Japanses Patent Application No. 2007-241067 (w/translation).

* cited by examiner

*Primary Examiner*—Edward Tso
*Assistant Examiner*—Ramy Ramadan
(74) *Attorney, Agent, or Firm*—Oliff & Berridge, PLC

(57) ABSTRACT

An on-vehicle charging apparatus charges a battery mounted on the vehicle. In the apparatus, a generator generates electric power to output voltage for charging the battery and a controller, which is located outside the generator, outputs a pulse signal for controlling a generated state of the generator. A reception device receives the pulse signal outputted from the controller. The received signal is subjected to filtering at a filter, where pulse signals whose cycles are different from a predetermined cycle are removed. Further, using the outputted pulse signal from the filter, a duty ratio of the pulse signal is calculated. A voltage outputted from the generator is regulated based on the calculated duty ratio.

10 Claims, 5 Drawing Sheets

APPARATUS FOR CHARGING ON-VEHICLE BATTERY AND APPARATUS FOR CONTROLLING GENERATING OPERATION OF ON-VEHICLE GENERATOR

CROSS REFERENCES TO RELATED APPLICATION

The present application relates to and incorporates by reference Japanese Patent Application No. 2007-241067 filed on Sep. 18, 2007.

BACKGROUND OF THE INVENTION

1. Technical Field

The present invention relates to an on-vehicle charging apparatus for charging a battery by a generator (i.e., alternator) mounted in vehicles such as passenger cars and trucks and a control apparatus for controlling the generated state of the on-vehicle generator.

2. Related Art

Most vehicles are provided with AC (alternating current) generators (i.e., alternators) driven by on-vehicle engines to generate electric power. The operation of such a generator is controlled by a control apparatus called an IC regulator so that the output voltage of the generator becomes a specified value. Meanwhile, it is required for the generators to still be operable even when the idling rotation speed of an engine is low, the amount of electric loads mounted on a vehicle becomes large, and/or the engine consumes less fuel. These demands are typical for recent engines.

To meet such needs, one conventional control technique is provided by Japanese Patent Publication No. 3070788, in which the output voltage of an on-vehicle AC generator is controlled based on vehicle running states, engine operating states, and battery charged states. More practically, in this control technique, a duty signal whose duty ratio corresponds to a reference voltage is sent from an engine control apparatus (engine ECU (electronic control unit)) to an IC regulator, so that the IC regulator controls the output voltage of the generator to be at the reference voltage.

The recent needs for reducing the fuel consumption during a vehicle running period have required the generator to generate a sufficient power at a minimum fuel consumption by properly controlling the amount of work of the generator in response to vehicle running states and battery charged states. An example is that, when the vehicle is in acceleration, the output voltage of the generator is controlled to lower values (for example, down to a minimum voltage of 12 V) so that the physical load to the engine reduces for lowering the fuel consumption. In contrast, when the vehicle is in deceleration, the output voltage of the generator is controlled to higher values (for example, up to a maximum voltage of 15 V) so that the generated amount from the generator increases for rapidly charging the battery. This permits the inertia energy of the engine to be converted to electric power, thereby effectively making use of the fuel.

In controlling the output voltage of the generator, the ECU transmits to the IC regulator a pulse signal whose cycle (pulse repetition time) is specified and constant. However, for example, different manufactures may produce ECUs of which pulse cycles are different from each other. And it is often required to employ those ECUs as an on-vehicle ECU to transmit a pulse signal to the on-vehicle IC regulator. Thus the IC regulator should have a margin for receiving pulse signals having different cycles. However, noise may be superposed in the pulse signal. In such a case, when the IC regulator has a large amount of the margin for the cycle, the amount of the noise tends to be greater as well, which may cause the IC regulator to erroneously recognize the pulse signal. As a result, the output voltage of the generator may not be controlled properly, thereby resulting in undesired changes in the output voltage.

SUMMARY OF THE INVENTION

The present invention has been made in consideration of the foregoing situations, and an object of the present invention is to provide a charging apparatus and a control apparatus, which can be mounted on a vehicle and have the capability of preventing erroneous detection of a pulse signal for controlling the output voltage of an on-vehicle AC generator (alternator).

In order to achieve the above object, the present invention provides, as one aspect, a charging apparatus which is mounted on a vehicle to charge a battery mounted on the vehicle, comprising: a generator that generates electric power to output voltage for charging the battery; a controller, which is located outside the generator, that outputs a pulse signal for controlling a generated state of the generator; a reception device that receives the pulse signal outputted from the controller; a filter that removes, of the received pulse signal, a pulse signal having cycles (periodic times or pulse repetition times) different from a predetermined cycle which is set in relation to the pulse signal itself; a calculator that calculates a duty ratio of the pulse signal having a cycle which agrees with the predetermined cycle, depending on a filtered result of the filter; and a voltage regulator that regulates a voltage outputted from the generator according to the duty ratio calculated by the calculator.

As another aspect, the present invention provides a control apparatus for controlling generation of an on-vehicle generator, comprising: a reception device that receives a pulse signal supplied from outside the control apparatus; a filter that removes, of the received pulse signal, a pulse signal having cycles different from a predetermined cycle which is set in relation to the pulse signal itself; a calculator that calculates a duty ratio of the pulse signal having a cycle which agrees with the predetermined cycle, depending on a filtered result of the filter; and a voltage regulator that regulates a voltage outputted from the generator according to the duty ratio calculated by the calculator.

Hence, the pulse signal received by the reception device is subjected to filtering at the filter, so that pulse signals which are influenced by noise for example are removed when the cycles of the pulse signals are different from the predetermined cycle. This predetermined cycle is set using the pulse signal itself. For example, the initial cycle of the pulse signal received in response to the activation of the apparatus is set as the predetermined cycle. Accordingly, erroneous control of the generator, which is due to noise for example included in the pulse, can be avoided.

DETAILED DESCRIPTION OF PREFERRED EMBODIMENTS

Hereinafter, embodiments of the present invention, which are reduced into practice as a charging apparatus and a control apparatus for controlling the generation of power in a vehicle, will now be described.

First Embodiment

Referring to FIGS. 1 to 4A and 4B. a first embodiment of the present invention will now be described.

Figure 1:
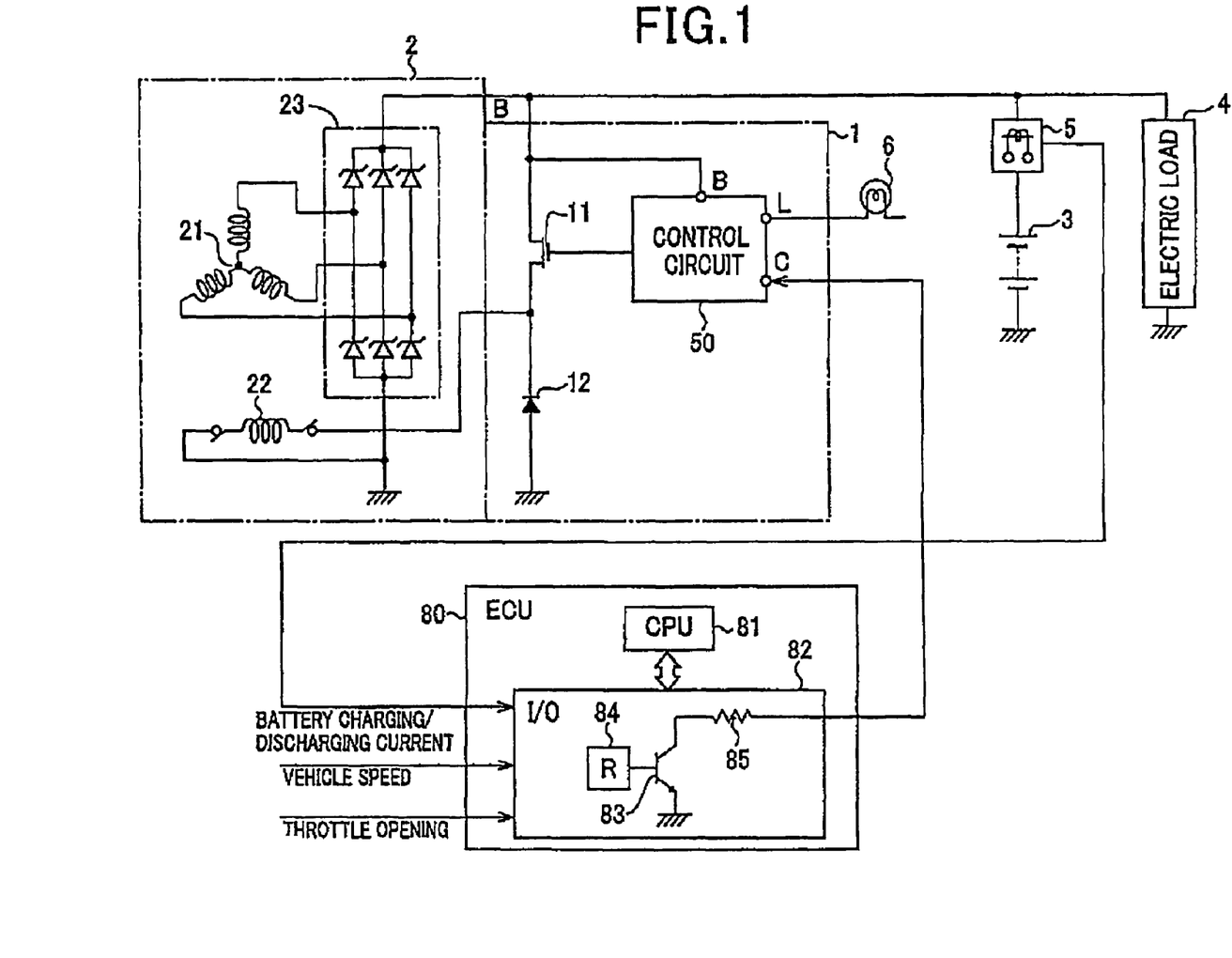
FIG. 1 is a circuit diagram showing the configuration of a charting apparatus including a control apparatus, according to a first embodiment of the present invention.

FIG. 1 shows the configuration of a charging apparatus mounted on a vehicle. The present charging apparatus is provided with a generation control apparatus 1 for controlling power generation in the vehicle, an AC generator 2 (i.e., alternator; in the following, simply referred to as a "generator") mounted in the vehicle, a battery 3, an ECU (electronic control unit) 80 for engine control.

The generation control apparatus 1 is in charge of controlling the output voltage of the generator 2 within a predetermined range of voltage. The detailed description of this generation control apparatus 1 will be given later.

The generator 2 is equipped with three-phase stator windings 21 wound in a stator (not shown), a field winding 22 embedded in a rotor (not shown), and a full-wave rectification circuit 23 that applies full-wave rectification to three-phase outputs from the stator windings 21. The output voltage of the generator 2 is controlled by adjusting field current made to pass through the field winding 22. The generator 2 has an output terminal (called a "B" terminal), which is electrically connected to the battery 3 and other electric consuming elements including electric loads 4. Hence, the current, that is, electric power, is supplied from the generator 2 to the battery 3 and the electric consuming elements.

The ECU 80 serves as not only a control device that controls the engine (not shown) but also an external control device used for the generation control apparatus 1. That is, the ECU 80 notifies the generation control apparatus 1 of power generating states of the generator 2 on the basis of information indicating changing states of the battery 3 (charging/discharging currents of the battery), vehicle speed, throttle opening, and others. For this control, the ECU 80 is provided with a CPU (central processing unit) 81 to perform predetermined control programs and an input/output interface 82 to perform specified input and output processes on various signals that are inputted and outputted to and from the ECU 80.

The ECU 80 sends out a pulse signal to the generation control apparatus 1 in order to allow the ECU 80 to provide commands to the generation control apparatus 1. The duty ratio (or simply duty) of the pulse signal can be changeably set, so that the contents of the commands are transmitted by changing the duty ratio of the pulse signal. The input/output interface 82 is provided with a transistor 83 serving as a switching element and a resistor (R) 84, which are in charge of producing the pulse signal. For protecting the transistor 83, a further resistor 85 is inserted in an output line connecting the input/output interface 82, that is, the ECU 80 and the generation control apparatus 1. Through the output line, the pulse signal is transmitted from the ECU 80 to the generation control apparatus 1.

Figure 2:
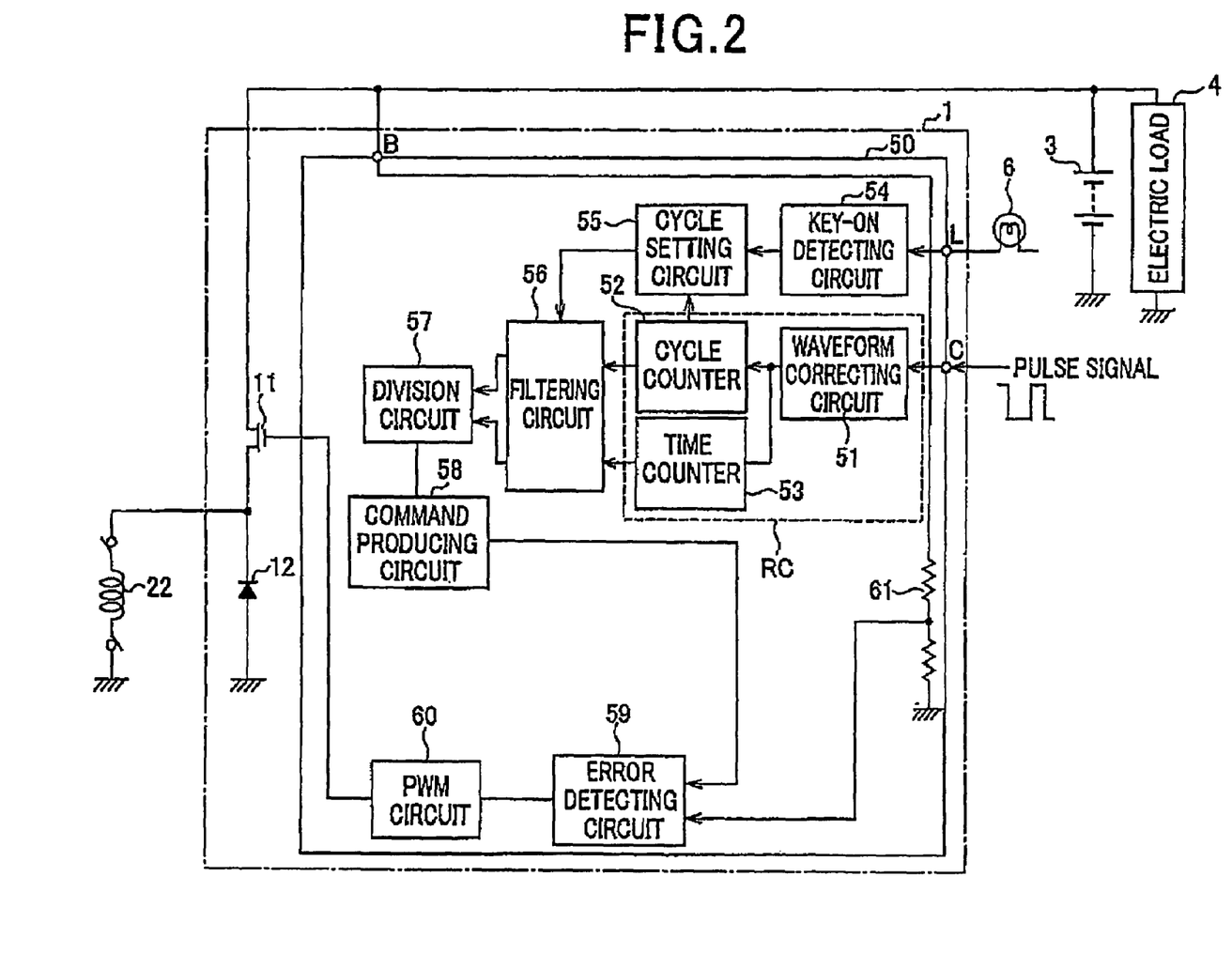
FIG. 2 is a block diagram detailing the configuration of a control circuit employed in the charring apparatus.

The generation control apparatus 1 will now be detailed. As shown in FIGS. 1 and 2, the generation control apparatus 1 is provided with a power transistor 11 electrically connected in series to the field winding 22 of the generator 2 to interrupt the field current, a diode 12 electrically connected in parallel to the field winding 22 to reflux the field current when the power transistor 11 is in its off state. The generation control apparatus 1 is also provided with a control circuit 50 to control the interrupting actions of the power transistor 11 such that the terminal voltage (called a battery voltage) of the battery 3 is monitored to control this voltage within a specified range of voltage.

As shown in FIG. 2, the control circuit 50 comprises a waveform correcting circuit 51, a cycle counter 52, a time counter 53, a key-on detecting circuit 54, a cycle setting circuit 55, a filtering circuit 56, a division circuit 57, a command producing circuit 58, an error detecting circuit 59, a PWM circuit 60, and a voltage dividing circuit 61.

Of these components, the waveform correcting circuit 51 is in charge of correcting the waveform of the pulse signal given to a control terminal (called a "C" terminal) of the control circuit 50 from the ECU 80. The cycle counter 52 is placed to count the cycle (pulse repetition time or periodic time) of the pulse signal which has been subjected to the waveform correction at the waveform correcting circuit 51. The cycle counter 52 monitors a last transition edge in each cycle to count the cycle in each pulse repetition. The time counter 53 is placed to count the low-level duration of the pulse signal which has been subjected to the waveform correction at the waveform correcting circuit 51. The time counter 53 monitors the first transition edge appearing immediately after the last transition edge, so that the time counter 53 is able to count the low-level duration in each cycle.

The key-on detecting circuit 54 is placed to be connected to a terminal, called an "L" terminal, to detect an activation signal via a charge lamp electrically connected to the L terminal. The active activation signal is generated in response to turning on the key switch. The cycle setting circuit 55 reads in a signal (i.e., a count) outputted from the cycle counter 52 when the generation control apparatus 1 is activated initially, and sets therein the read cycle of the pulse signal coming from the ECU 80.

The filtering circuit 56 reads in information indicative of the cycle which has been set by the cycle setting circuit 55, and compares the count of the cycle counter 52 with the reference cycle specified by the cycle setting circuit 55. If the current cycle supplied from the cycle counter 52 is different from the set reference cycle, the filtering circuit 56 removes the current cycle (i.e., equivalently, the pulse signal having a cycle different from the set reference cycle) together with the low-level duration supplied from the time counter 53. In this case, the filtering circuit 56 is a given a margin (for example, ±10%) to the set reference cycle in consideration with slight changes in the cycle of the pulse signal, which are due to jitters or others occurring during the pulse signal transmission, though the cycle of the pulse signal is still admitted as being in its normal range. In the present embodiment, in consideration of such slight changes in the cycle, the filtering characteristics of the filtering circuit 56 are decided to admit such slight cycle changes as being within the normal range.

There are two inputs to the division circuit 57, one of which is the counted low-level duration of the pulse signal counted by the time counter 53 and made to pass the filtering circuit 56 when the cycle of the pulse signal is equal to or is within the set reference cycle. The other input is the counted cycle of the pulse signal counted by the cycle counter 52 and made to pass the filtering circuit 56 when the cycle of the pulse signal is equal to or is within the set reference cycle. At the division circuit 57, the low-level duration of the pulse signal is divided by the counted cycle of the pulse signal which has been filtered by the filtering circuit 56, with the result that the duty ratio of the pulse signal can be calculated. In this case, the duty ratio is a low-level duty ratio.

Figure 3:
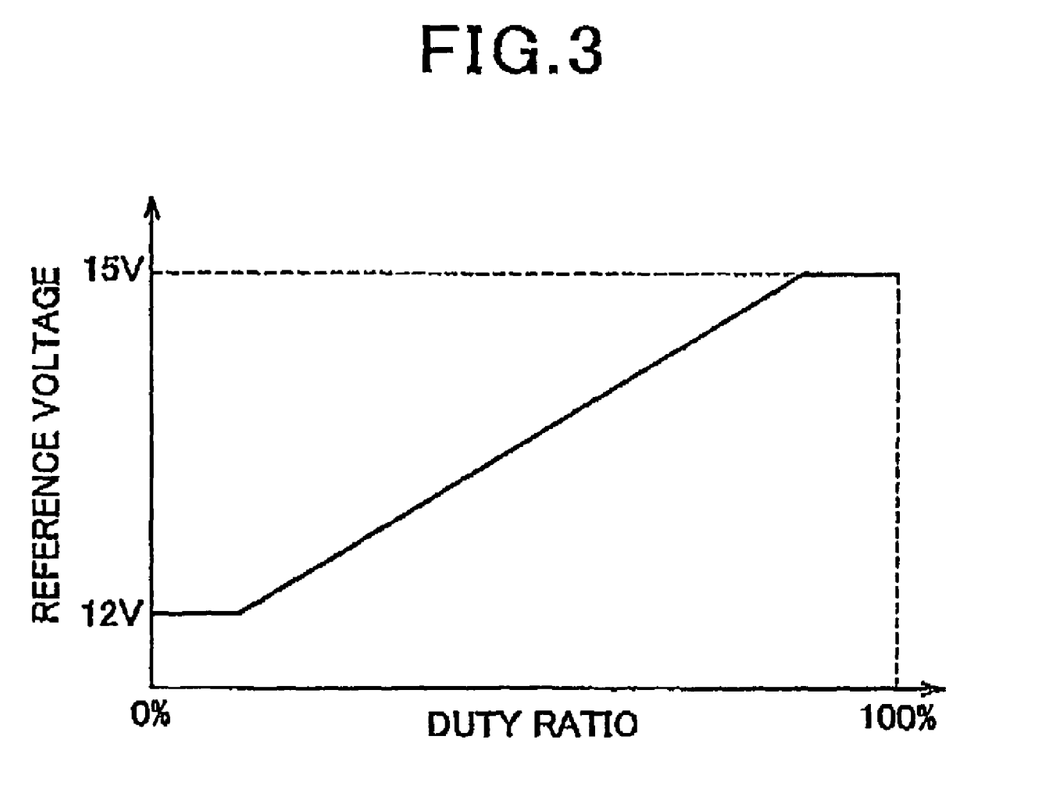
FIG. 3 is a graph showing the relationship between a duty ratio and a reference voltage, which is used in the embodiment.

Since a signal indicating the obtained duty ratio is issued from the division circuit 57, the command producing circuit 58 receives the signal to produce a reference voltage by making reference to a characteristic shown in FIG. 3. The characteristic is previously set as a reference table in a memory of the command producing circuit 58. As shown in FIG. 3, the reference voltage is changed almost linearly by the low-level duty ratio.

The error detecting circuit 59 is placed to receive the reference voltage produced by the command producing circuit 58 and a voltage produced by dividing the battery voltage using the voltage dividing circuit 61. The battery voltage is a voltage applied to the B terminal of the generator 2. Hence the error detecting circuit 59 compares both the reference and divided voltages with each other, and depending on its compared results, outputs a low-level or high-level signal, which is supplied to the PWM circuit 60.

The PWM circuit 60 is configured to a produce a drive signal with a predetermined duty ratio by performing PWM (pulse width modulation) during the high-level duration of the output signal from the error detecting circuit 59. The produced drive signal is supplied to the power transistor 11 for the drive thereof. The drive signal enables the power transistor 11 to turn on/off according to the predetermine duty ratio, allowing the field winding 22 to pass intermittent currents therethrough in a controlled manner. Hence the output voltage of the generator 2 is able to increase, which will cause the terminal voltage of the battery 3 to increase as well.

Of the above components, the filtering circuit 56 functions as a filter, the division circuit 57 and the time counter 53 function as a calculator, and the command producing circuit 58, the error detecting circuit 59, the PWM circuit 60, and the voltage dividing circuit 61 compose a voltage regulator. The key-on detecting circuit 54, the cycle setting circuit 55, and the cycle counter 52 compose an acquisition unit, and the cycle setting circuit also functions as a storage.

The operations and advantages of reception of the pulse signal from the ECU 80, which is performed by the control circuit 50 as a main part of the present invention, will now be described.

In the generation control apparatus 1 according to the present embodiment, the pulse signal is supplied to the waveform correcting circuit 51 from the ECU 80. The pulse signal, whose waveforms are corrected as much as possible by this circuit 51, is then fed to both counters 52 and 53, with the cycle and low-level duration of the pulse signal counted thereat.

By the way, these three elements 51, 52 and 53 are provided as a reception device RC, and this reception device RC is designed to be able to receive pulse signals of different cycles (i.e., a margin for the cycle) in order to cope with different manufacturers of the ECU.

In the present embodiment, in response to the activation of the generation control apparatus 1, the cycle setting circuit 55 reads the cycle of the pulse signal coming from the ECU 80. Hence, the cycle of the pulse signal passing the filtering circuit 56 is set. It is therefore possible to receive and process the pulse signal from any ECUs 80 of which signal characteristics may differ from each other. If noise deforms the waveform of the pulse signal, the deformed pulse signal is removed by the filtering circuit 56 together with the count of the low-level duration counted by the time counter 53.

In this way, the present embodiment provides the charging apparatus including the generation control apparatus 1 configured to receive the pulse signal from different ECUs 80. If the pulse signal is influenced by noise to make its cycle differ from the set (specified) signal cycle, the pulse signal with noise components is removed. Accordingly, the pulse signal for controlling the output signal of the generator 2 can be obtained without erroneous detection.

In addition, since the cycle setting circuit 55 is employed, it is possible to initially decide the cycle of a pulse signal at a timing when the generation control apparatus 1 is activated. Hence, even if an ECU 80, which is newly mounted, provides the generation control apparatus 1 with a pulse signal whose cycle is different from that of the previous ECU, the pulse signal from the new ECU 80 can be received normally.

Figure 4A:
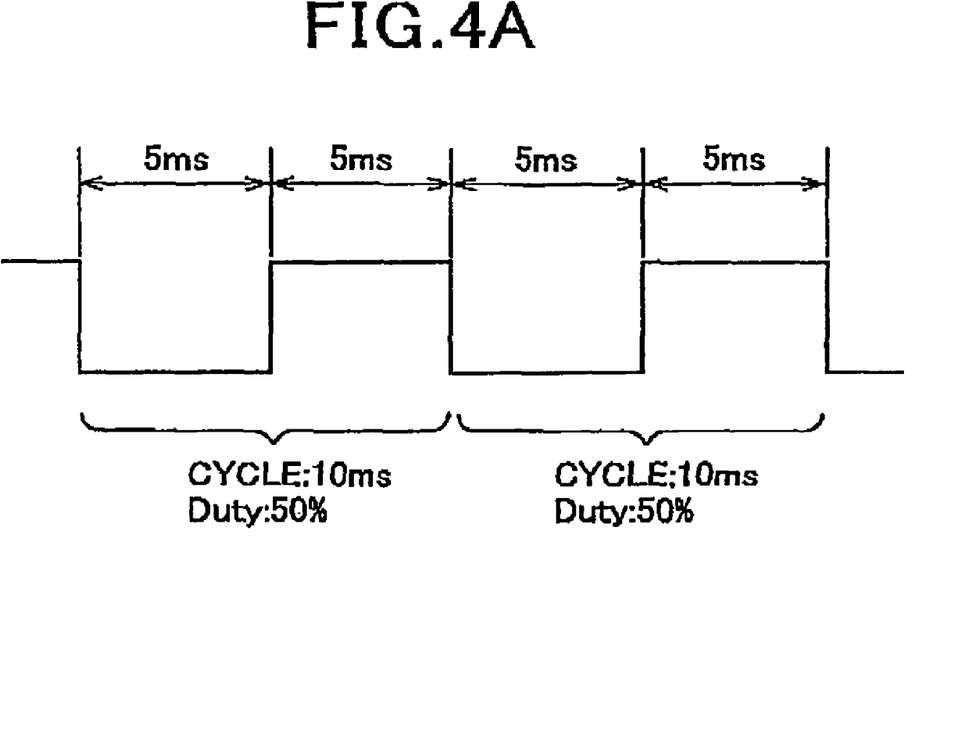
FIGS. 4A and 4B are timing charts each exemplifying a pulse signal received by the control circuit from an ECU.
Figure 4B:
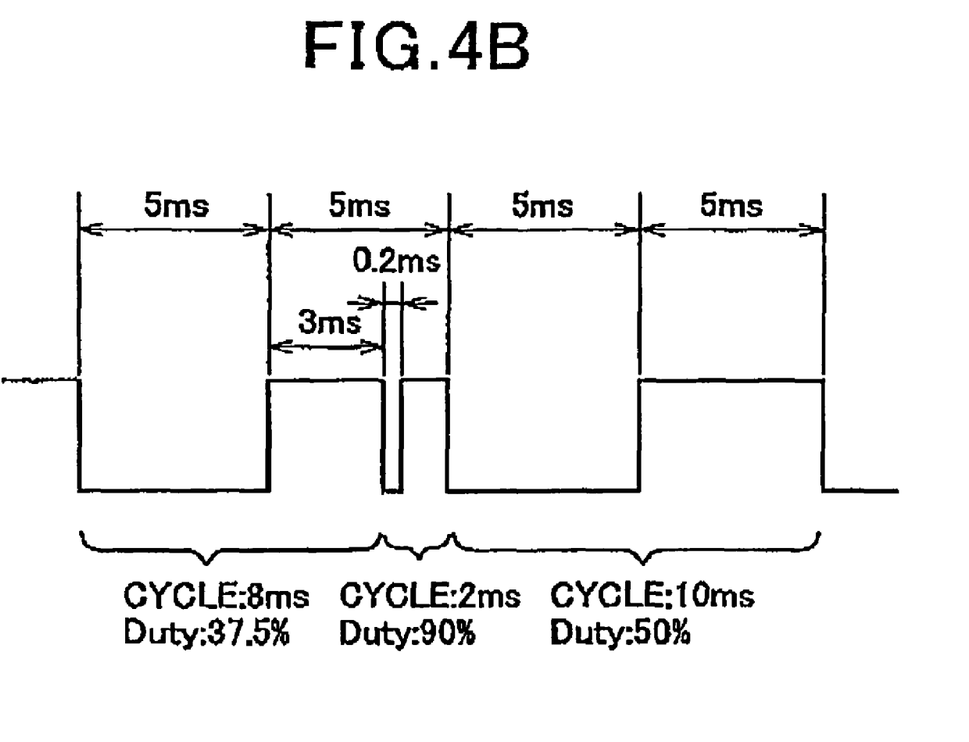

FIGS. 4A and 4B exemplify the waveforms of pulse signals received from the ECU, where the waveform shown in FIG. 4A has no noise but that shown in FIG. 4B has noise. In the example shown in FIG. 4A, the waveform is produced to have a pulse repetition time, that is, the cycle of 10 ms and a duty of 50%, with no noise therein. In contrast, in the example shown in FIG. 4B, the waveform has the same cycle and duty ratio as those in FIG. 4A, but has noise superposed thereon. The noise deforms the waveform into three different waveforms consisting of a waveform of 8 ms cycle and 37.5% duty ratio (high-level duty), a waveform of 2 ms and 90 duty ratio, and a waveform of 10 ms and 50% duty ratio. If the conventional technique is applied to the waveform shown in FIG. 4B, an IC regulator, that is, the control circuit erroneously reads all the three waveforms as normal ones. In contrast, in the present embodiment, the former two waveforms having the cycles 8 ms and 2 ms are removed by the filtering circuit 56, thus allowing the components following the filtering circuit 56 to reliably control the operations of the generator based on the noise-removed pulse signal.

Second Embodiment

Figure 5:
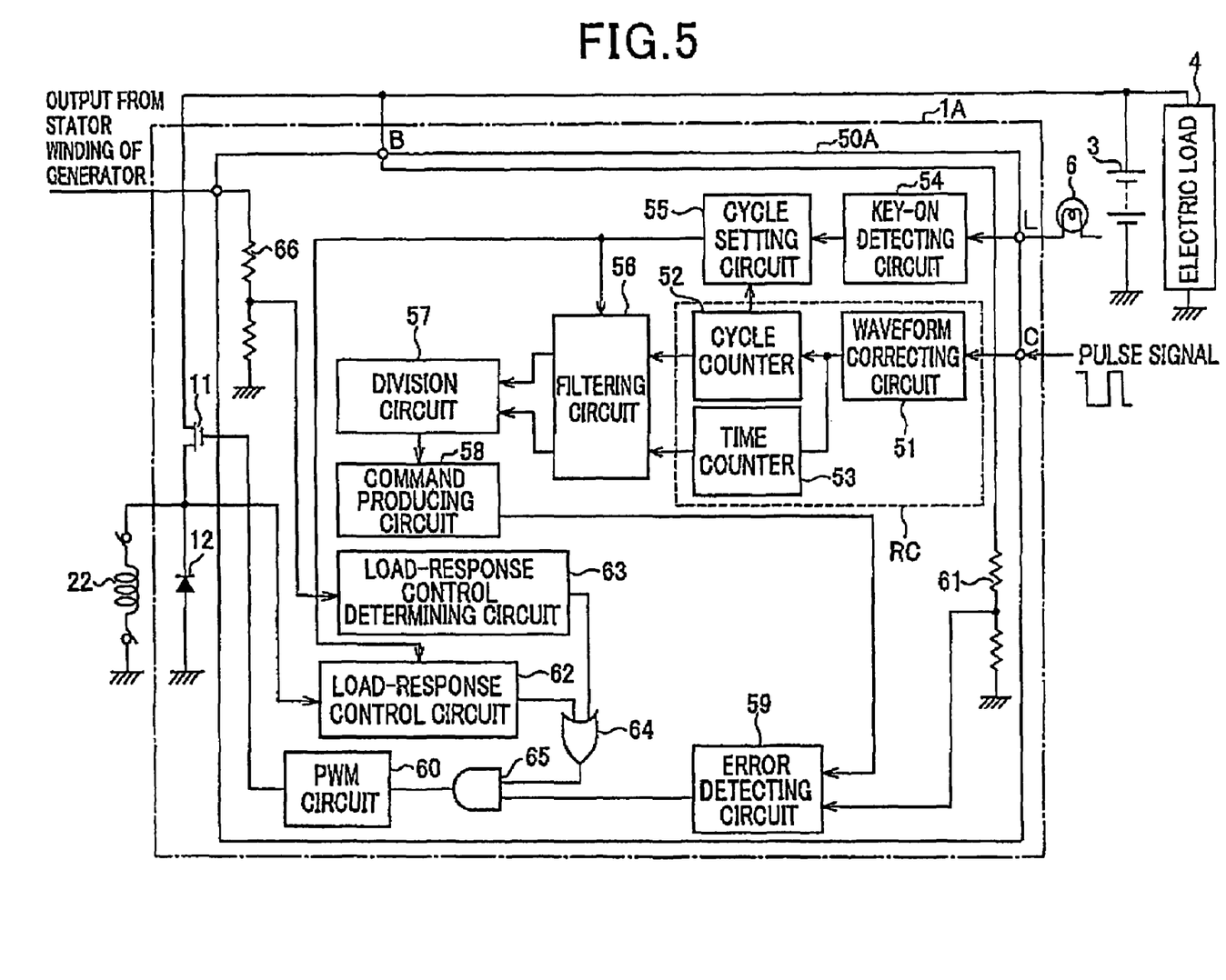
FIG. 5 is a block diagram detailing the configuration of a control circuit employed in a charging apparatus according to a second embodiment of the present invention.

Referring to FIG. 5, a second embodiment of the present invention will now be described.

The entire configuration of a charging apparatus shown in FIG. 5 is similar to that shown in the first embodiment except for a generation control apparatus 1A provided with a control circuit 50A. FIG. 5 details the configuration of this control circuit 50A, in which the identical or similar components to those shown in FIG. 2 are given the same reference numerals as those shown in FIG. 2, simplifying the explanations.

When being compared with the control circuit 50 in the first embodiment, the control circuit 50A is additionally provided with a load-response control circuit 62, a load-response control determining circuit 63, an OR (logical addition) circuit 64, an AND (logical multiplication) circuit 65, and a voltage dividing circuit 66.

The load-response control circuit 62 is electrically connected to a connection point connecting the power transistor 11 and the field winding 22. This control circuit 62 is in charge of detecting the electric conductivity of the power transistor 11 and gradually increasing this conductivity, which is referred to as load response control. The load response control is intended to suppress changes in the rotation of an on-vehicle engine in an idling rotation range of the vehicle, which rotational changes are attributable to changes in the amount of on-vehicle electric loads. Normally, when the rotation number of the vehicle becomes larger than the idling rotation range, the load response control is stopped.

The load-response control determining circuit 63 is in charge of detecting the rotation number (i.e., the number of rotations) of the generator 2 for determining whether or not the load response control is valid or invalid. This determining circuit 63 is electrically connected to the voltage dividing circuit 66 to detect the phase voltage of one of the stator windings 21 on the basis of the divided voltage. Using the detected phase voltage, the determining circuit 63 detects the rotation number to determine whether or not the load response control is valid or invalid. For example, the frequency of the phase voltage is used to detect the rotation number, and a low-level signal showing that the load response control is valid is outputted from the determining circuit 63 when the rotation number of the generator 2 is less than a predetermined value.

The OR circuit 64 has two input terminals which are electrically connected to the output points of the load- response control circuit 62 and the load-response control determining circuit 63, respectively. In cases where the output of the load-response control determining circuit 63 is low level, that is, the rotation number of the generator 2 is less than the predetermined value, the output of the load-response control circuit 62 is provided to the AND circuit 65 via the OR circuit 64, thus making it valid the load response control carried out by the load-response control circuit 62. In contrast, in cases the output of the load-response control determining circuit 63 is high level, that is, the rotation number of the generator 2 is equal to or higher than the predetermined value, the output of the OR circuit 64 is fixed at the high level independently of the values of the output of the load-response control circuit 62. Hence the output of this control circuit 62 is masked, stopping the load response control.

In the present invention, the load-response control circuit 62 is also configured to receive, from the cycle setting circuit 55, the information indicative of the cycle (pulse repletion time or periodic time) of the pulse signal received when the generation control apparatus 1A is activated. In addition, this control circuit 62 is configured to update, in its internal memory, an increasing speed of the electric conductivity depending on the received cycle information. The increasing speed of the electric conductivity thus functions as a controlled parameter for the generator 2.

For example, the load-response control circuit 62 is set such that the increasing speed of the electric conductivity is 40%/s for pulse cycles less than 5 ms and is 20%/s for pulse cycles equal or higher to or than 5 ms, and both conductivities are switchable from each other. In this case, in cases the vehicle engine torque is so large that influence of changes in the amount of on-vehicle electric loads is less, the cycle of the pulse signal can be made less than 5 ms, thus switching the increasing speed of the electric conductivity to a larger amount of 40%/s. In contrast, in cases the vehicle engine torque is smaller so that it is likely to have a larger influence of changes in the amount of on-vehicle electric loads, the cycle of the pulse signal can be made equal to or higher than 5 ms, thus switching the increasing speed of the electric conductivity to a smaller amount of 20%/s. That is, the controlled parameters of the generator 2 can be controlled from the outside thereof depending on vehicle states.

Thus, the load-response control circuit 62 composes controlled parameter switching means.

In this way, in the generation control apparatus 1A according to the present embodiment, depending on the cycle of the pulse signal which is stored in the cycle setting circuit 55, the controlled parameter of the generator 2 is switched over between both values therefore by the load-response control circuit 62. Hence, in accordance with the cycle of a pulse signal received from the ECU 80 at the timing of the activation, the controlled parameter of the generator 2 can be controlled, with the result that the ECU 80 is able to change the controlled parameter. In particular, as described, since the controlled parameter is for suppressing an increase in the field current of the generator 2, it is possible that influence of changes in the torque of the generator, which occurs when an electric load is put in operation, can be adjusted to characteristics which agree with the current state of the vehicle.

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A charging apparatus mounted on a vehicle to charge a battery mounted on the vehicle, comprising:
   a generator that generates electric power to output voltage for charging the battery;
   a controller, which is located outside the generator, that outputs a pulse signal for controlling a generated state of the generator;
   a reception device that receives the pulse signal outputted from the controller;
   a filter that removes, from the received pulse signal, a pulse signal having cycles different from a cycle of the received pulse signal;
   a calculator that calculates a duty ratio of the pulse signal having a cycle which agrees with the cycle of the received pulse signal, depending on a filtered result of the filter;
   a voltage regulator that regulates a voltage outputted from the generator according to the duty ratio calibrated by the calculator;
   an acquisition unit that initially acquires the cycle of the pulse signal received by the reception device when the charging apparatus is activated; and
   a storage that stores information indicative of the cycle of the received pulse signal acquired by the acquisition unit,
   wherein the filter is configured to remove, from the received pulse signal, the pulse signal whose cycle is different from the information indicative of the cycle stored in the storage.

2. The charging apparatus of claim 1, wherein the voltage regulator is configured to regulate the voltage outputted from the generator to an output voltage which changes substantially linearly with changes in the duty ratio calculated by the calculator.

3. The charging apparatus of claim 2, wherein the duty ratio calculated by the calculator is a low-level duty ratio of the pulse generator.

4. The charging apparatus of claim 1, comprising a changing unit that changes a controlled parameter of the generator based on the information indicative of the cycle stored in the storage, the controlled parameter being assigned to controlling an operating state of the generator.

5. The charging apparatus of claim 4, wherein the controlled parameter is a parameter for suppressing an increase in a field current of the generator.

6. A control apparatus for controlling generation of an on-vehicle generator, comprising:
   a reception device that receives a pulse signal supplied from outside the control apparatus;

a filter that removes, from the received pulse signal, a pulse signal having cycles different from a cycle of the received pulse signal;

a calculator that calculates a duty ratio of the pulse signal having a cycle which agrees with the cycle of the received pulse signal, depending on a filtered result of the filter;

a voltage regulator that regulates a voltage outputted from the generator according to the duty ratio calculated by the calculator;

an acquisition unit that initially acquires the cycle of the pulse signal received by the reception device when the control apparatus is activated; and a storage that stores information indicative of the cycle of the received pulse signal acquired by the acquisition unit, wherein the filter is configured to remove, from the received pulse signal, the pulse signal whose cycle is different from the information indicative of the cycle stored in the storage.

7. The control apparatus of claim 6, wherein the voltage regulator is configured to regulate the voltage outputted from the generator to an output voltage which changes substantially linearly with changes in the duty ratio calculated by the calculator.

8. The control apparatus of claim 7, wherein the duty ratio calculated by the calculator is a low-level duty ratio of the pulse generator.

9. The control apparatus of claim 6, comprising a changing unit that changes a controlled parameter of the generator based on the information indicative of the cycle stored in the storage, the controlled parameter being assigned to controlling entitled to control an operating state of the generator.

10. The control apparatus of claim 9, wherein the controlled parameter is a parameter for suppressing an increase in a field current of the generator.

* * * * *